Patented Dec. 16, 1930

1,785,641

UNITED STATES PATENT OFFICE

IRVING E. MELHUS, OF AMES, IOWA

COMPOSITION FOR AND PROCESS OF TREATING PLANT WOUNDS

No Drawing.   Application filed June 17, 1926.  Serial No. 116,748.

This invention relates to compositions and processes which find special adaptation for dressing wounds on trees and other plants.

Among the objects of this invention is to provide a composition which may be readily applied to wounds on trees and other plants for the purpose of healing the wounds and preventing further damage and deterioration at the place where the trees or other plants have been injured. A further object of this invention is to provide a composition for dressing wounds on trees and other plants, which composition is more effective than the compositions heretofore employed, and which quickly forms a protective coating upon the portion of the plant to which it is applied. A still further object of this invention is to provide a composition of the character heretofore described which may be used as a preservative for wood in the nongrowing state, such as piles, posts, foundation timber, etc.

In preparing my improved composition, a condensing agent, furfural and a hydroxyl derivative of an aromatic hydrocarbon are mixed and introduced into a reflux condenser where the mixture is boiled until a resin is formed. This resin is then dissolved in an organic solvent, such as a mixture of furfural and acetone, the acetone serving as a drying agent and the furfural as a vehicle, and to this is then added a fungicide. If desired, there may be added to the resulting mixture a thickening agent such as cellulose nitrate, which gives the mixture the desired consistency or viscosity.

As the hydroxyl derivative of an aromatic hydrocarbon, I prefer to use creosol, for example ordinary commercial creosol, but the ortho, para and meta cresols may be used separately and other compounds of this class, such as phenol, may be substituted, in whole or in part, for the creosol.

As a condensing agent, either an alkali or an acid may be employed. The preferred condensing agent is sodium bicarbonate.

As a solvent and drying agent, a mixture of furfural and acetone is preferred, but other organic solvents may be used in lieu of this mixture. The furfural is highly valuable for this purpose, in that it has the characteristic ability to penetrate and disinfect dead wood and yet has no adverse effect on the living tissues. Furthermore, it is an excellent solvent for resin of the phenol-furfural and the cresol-furfural types.

Cellulose nitrate is the preferred material used for the thickening agent but other materials which will impart the desired viscosity to the mixture may be substituted, for example the cup skimmings from turpentine distillation, gums and gelatinous materials commonly employed in varnishes and also shellac.

As a fungicide I prefer to use mercuric cyanide, but other salts of mercury or other toxic compounds, for example the salts of the heavy metals, such as lead, copper, arsenic, etc., may be substituted in whole or in part for the mercuric cyanide.

A specific example of preparing my composition is as follows:

To a mixture of about equal parts by weight of commercial creosol and furfural there is added about one percent of sodium bicarbonate and the mixture boiled in a reflux condenser until a resin forms. The boiling is discontinued when a test shows that a thin film of the mass becomes slightly brittle upon cooling. The resinous mass is then dissolved in approximately equal parts of acetone and furfural. Mercuric cyanide dissolved in a small quantity of acetone is then added to the solution of the resin in acetone and furfural. This free furfural serves as a fungicide and as a vehicle. It penetrates the dead wood on the plant and carries some of the filler with it. In order to add bulk to the mixture, a small amount of cellulose nitrate may be added. This cellulose nitrate dissolves in the acetone present in the mixture.

In using sodium bicarbonate as a condensing agent, very satisfactory results are obtained with one to two percent of this material. The quantity of sodium bicarbonate may be increased above 2%, but it does not serve any useful purpose to do so. It is not advisable to use less than ½% of condensing agent.

The quantity of furfural in the furfural-acetone solvent may vary from 25-100%.

The quantity of the resinous condensation product may vary from 1-6 pounds per gallon of mixture, depending on the consistency desired.

The quantity of mercuric cyanide employed may be varied from a small fraction of a percent to several percent, it being necessary to have a sufficient amount of this poisonous ingredient to produce the desired toxicity.

The quantity of cellulose nitrate or other thickening agent employed is varied to meet the particular needs and fancy of the user and generally from 1-5% in the final product is sufficient. Where thicker mixtures are desired certain paint fillers, such as Venetian red or the gums or resins employed in paints and varnishes may be added to impart the desired consistency to the mixture.

I prefer to make this composition with a consistency of ordinary varnish so that it may be applied with a paint brush to a plant wound. The mixture dries quickly, forming a smooth, dark-brown, amorphous coating on either living or dead tissue. The rate of drying is determined largely by the proportion of acetone and furfural. The plastic and amorphous properties can be controlled by varying the degree of condensation of the creosol and furfural.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of treating wounds of trees and other plants, covering the wounds with a composition comprising a solution of a condensation product of furfural and a hydroxyl derivative of an aromatic hydrocarbon in an organic solvent containing furfural.

2. In a process of treating wounds of trees and other plants, covering the wounds with a composition comprising a solution of a condensation product of furfural and creosol in an organic solvent containing furfural.

3. In a process of treating wounds of trees and other plants, covering the wounds with a composition comprising a solution of a condensation product of furfural, creosol and a condensing agent in an organic solvent containing furfural.

4. In a process of treating wounds of trees and other plants, covering the wounds with a composition comprising a fungicide and a solution of a condensation product of furfural, creosol and a condensing agent in an organic solvent containing furfural.

5. In a process of treating wounds of trees and other plants, covering the wounds with a composition comprising a mercuric compound and a solution of a condensation product of furfural, creosol and a condensing agent in an organic solvent containing furfural.

6. In a process of treating wounds of trees and other plants, covering the wounds with a composition comprising a fungicide and a solution of a condensation product of furfural and a hydroxyl derivative of a benzene hydrocarbon in an organic solvent containing furfural.

7. In a process of treating wounds of trees and other plants, covering the wounds with a composition comprising an organic thickening agent, a fungicide and a solution of a condensation product of furfural and a hydroxyl derivative of an aromatic hydrocarbon in an organic solvent containing furfural.

8. In a process of treating wounds of trees and other plants, covering the wounds with a composition comprising an organic thickening agent, a fungicide and a solution of a condensation product of furfural, a hydroxyl derivative of a benzene hydrocarbon and a condensing agent in an organic solvent containing furfural.

9. In a wood and plant preservative and wound dressing for trees and other plants, a solution of a condensation product of furfural and a hydroxyl derivative of a benzene hydrocarbon in an organic solvent containing furfural.

10. In a wood and plant preservative and wound dressing for trees and other plants, a solution of a condensation product of furfural and creosol in an organic solvent containing furfural.

11. In a wood and plant preservative and wound dressing for trees and other plants, a solution of a condensation product of furfural, creosol and a condensing agent in an organic solvent containing at least 25% furfural.

12. In a wood and plant preservative and wound dressing for trees and other plants, a fungicide and a solution of a condensation product of furfural, creosol and a condensing agent in an organic solvent containing furfural.

13. In a wood and plant preservative and wound dressing for trees and other plants, a mercuric compound and a solution of a condensation product of furfural, creosol and a condensing agent in an organic solvent containing furfural.

14. In a wood and plant preservative and wound dressing for trees and other plants, a fungicide and a solution of a condensation product of furfural and a hydroxyl derivative of a benzene hydrocarbon in an organic solvent containing furfural.

15. In a wood and plant preservative and wound dressing for trees and other plants, an organic thickening agent, a fungicide and a solution of a condensation product of furfural and a hydroxyl derivative of a benzene hydrocarbon in an organic solvent containing furfural.

16. In a wood and plant preservative and wound dressing for trees and other plants, an organic thickening agent, a fungicide and a solution of a condensation product of furfural and a hydroxyl derivative of an aromatic hydrocarbon in an organic solvent containing furfural.

17. In a wood and plant preservative and wound dressing for trees and other plants, a solution of a condensation product of furfural and a hydroxyl derivative of a benzene hydrocarbon in an organic solvent containing furfural, substantially in the proportions described.

18. In a wood and plant preservative and wound dressing for trees and other plants, an organic thickening agent, a fungicide and a solution of a condensation product of furfural and a hydroxyl derivative of a benzene hydrocarbon in an organic solvent containing furfural, substantially in the proportions described.

In testimony whereof I affix my signature.

IRVING E. MELHUS.